July 4, 1933.   H. R. RICARDO   1,916,585
MEANS FOR DRIVING THE SPEED GOVERNORS OR OTHER
AUXILIARIES OF FLUID PRESSURE ENGINES
Filed Feb. 20, 1930
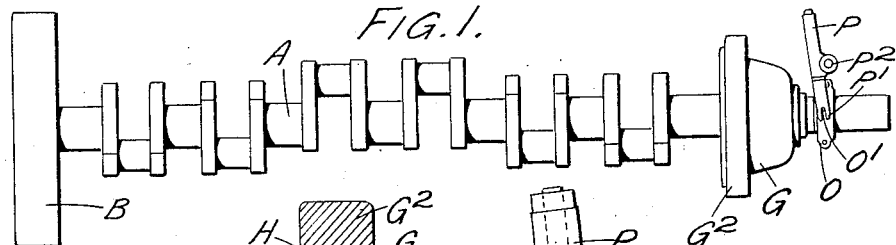
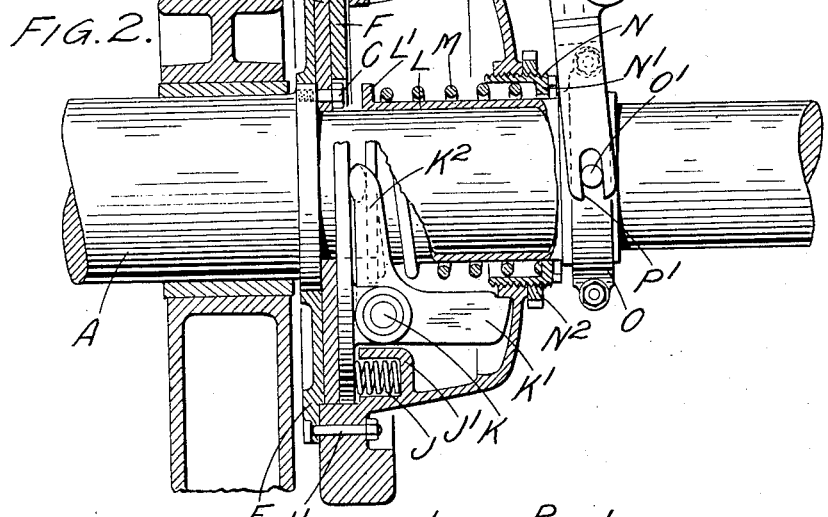
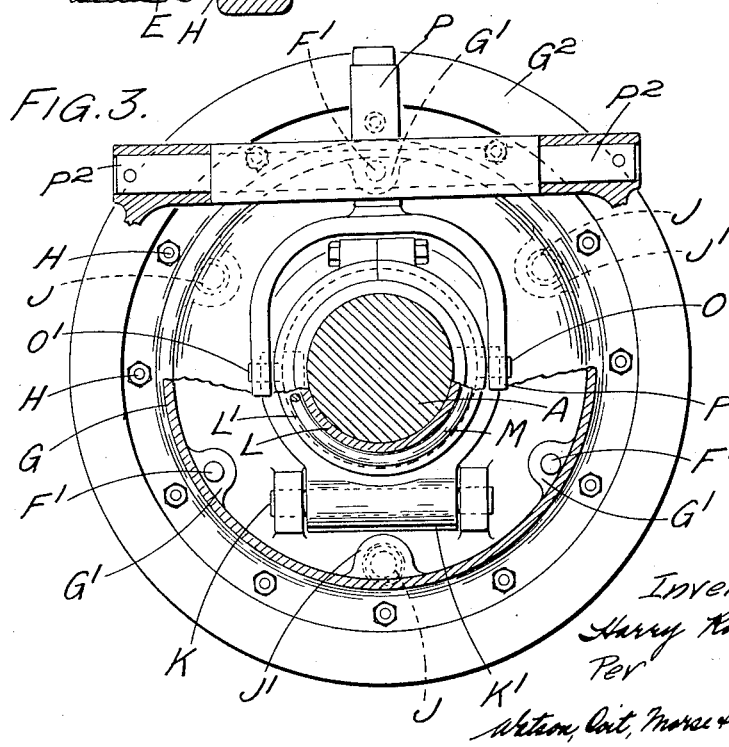
Inventor,
Harry Ralph Ricardo,
Per
Watson, Coit, Morse & Grindle, Attny Patented July 4, 1933

1,916,585

UNITED STATES PATENT OFFICE

HARRY RALPH RICARDO, OF LONDON, ENGLAND

MEANS FOR DRIVING THE SPEED GOVERNORS OR OTHER AUXILIARIES OF FLUID-PRESSURE ENGINES

Application filed February 20, 1930, Serial No. 430,097, and in Great Britain March 21, 1929.

This invention relates to fluid pressure engines of the kind employing a centrifugal governor to control the speed thereof and is more particularly applicable to high speed multi-cylinder internal combustion engines.

In such engines it is usual practice to drive the governor from the end of the crankshaft remote from the flywheel. The angular velocity of this end of the shaft is, however, usually irregular owing to torque variations producing torsional spring in the shaft and such irregularities may at times be considerably increased by synchronous torsional oscillations of the shaft due for example to the periodicity of the torque variations being substantially the same as the natural period of torsional vibration of the shaft. Since the governor weights have an appreciable moment of inertia, such irregularities in the speed of rotation of the end of the crankshaft to which the governor is connected produce considerable alternating forces on the governor which give rise to noise and produce wear in the weight pivots and other moving parts of the governor and, if the governor is driven through gearing, in the gear wheels also.

Further the inertia of the governor reduces the critical speed of the crankshaft and this will generally increase the risk of excessive torsional oscillations being set up in such shaft.

According to the present invention the governor is driven from the crankshaft or other rotary driving member through a friction clutch device which is peferably so constructed and arranged that, whereas it will transmit the normal regular drive to the governor, it will slip on the occurrence of undue irregularities in the angular velocity of a whole or a part of the driving member. Thus the friction clutch preferably constitutes such a driving connection between the driving member and the governor as will allow slip to occur between the driving and driven parts so as to cause damping of torsional oscillations in the driving member.

The invention may be carried into practice in various ways but one construction of crankshaft having a combined speed governor and torsional vibration damper according to the present invention as applied thereto is shown by way of example in the accompanying drawing, in which Figure 1 is a side elevation of a complete crankshaft and combined governor and torsional vibration damper, Figure 2 is a sectional side elevation on an enlarged scale of the combined governor and torsional vibration damper, and Figure 3 is a front elevation partly in section of the construction shown in Figure 2.

In the construction illustrated the crankshaft A to which the invention is applied is for an engine of the multicylinder type having six cylinders, and has a flywheel B mounted on one end thereof. Rigidly connected to the end of the crankshaft remote from the flywheel, for example by means of bolts C, is a driving friction plate or disc D disposed between two driven friction plates E and F one, E, of which is rigidly connected to a governor housing G by means of bolts H, while the other F is held from rotation relatively to the housing G by pins $F^1$ passing freely through holes in inwardly directed lugs $G^1$ on the housing G so as to permit the plate F to move axially. One or more helical springs J disposed in cup-like recesses $J^1$ formed in the housing G act on the axially movable plate F so as to press the friction plates F, D and E together. Mounted on pivots K within the governor housing are governor weights $K^1$ formed integral with arms $K^2$ which act on a flange $L^1$ on a sleeve L freely surrounding the end of the crankshaft A so that radial movement of the weights $K^1$ under the action of centrifugal force will tend to cause the sleeve L to move axially.

Surrounding the sleeve L is a helical spring M one end of which bears against the flange $L^1$ while its other end bears against the inwardly extending flange $N^1$ of an externally screwthreaded sleeve N engaging a similarly internally screwthreaded bore in the housing G, a lock nut $N^2$ being provided on the sleeve N. The member N, $N^1$ thus constitutes an adjustable abutment for the normally fixed end of the governor spring N so that the effective force of this spring can be varied. It will be seen that with the construction shown the spring M acting through the member N, N¹ and the casing G will tend to maintain the plate E in frictional contact with the plate D so that as the speed of the shaft A increases and the weights K¹ thus move outwardly under the action of centrifugal force to cause compression of the spring M the force exerted by this spring will be increased and hence will increase the friction between the plates E and D. Thus the available friction for damping out torsional oscillations in the shaft A will be greatest when the shaft A is rotating at high speed, i. e. when torsional oscillations are apt to be most intense.

The sleeve L extends through the sleeve N and acts on a collar O having external trunnions O¹ which engage slots P¹ in the end of a forked lever P mounted to swing on a transverse pivot P², this lever being adapted to be connected to the throttle or other control member of the engine to which the apparatus is applied. Thus the sleeve L may be provided with an enlarged end portion on which the collar O is so mounted as to permit rotative but not longitudinal movement of the sleeve L with respect to the collar. In this way movements of the governor weights K¹ under the action of centrifugal force are transmitted through the levers K² and sleeve L to the lever P so as to govern the engine speed in known manner.

With the apparatus described above it will be seen that the governor housing C and the governor mechanism carried thereby are connected to the crankshaft through a frictional driving connection constituted by the driving friction plate D and the driven friction plates E and F. The effective force of the springs J pressing these friction plates together is so determined that while the friction between the plates is sufficient normally to drive the governor, yet slip will take place between the driving friction plate and the driven friction plates E and F if undue irregularities occur in the speed of the adjacent end of the crankshaft due, for example, to torsional oscillations in this shaft so that these irregularities in speed are partially or wholly damped out and are not transmitted to the governor mechanism. Thus the governor, in addition to being isolated from undue irregularities in speed, also acts as a torsional oscillation damper for the crankshaft of the known "solid friction" type, and, in order to enable it to act efficiently in this respect, the governor housing may in some cases be provided with a heavy rim G².

What I claim as my invention and desire to secure by Letters Patent is:—

1. In a fluid pressure engine, the combination of a rotary driving member in which torsional oscillations are to be damped, a centrifugal governor for controlling the speed of the engine, this governor being mounted to rotate coaxially with one end of the rotary driving member and comprising governor weights and a spring acting on such weights, and a frictional driving coupling device connecting the governor directly to the rotary driving member and comprising driving and driven parts pressed together by the end of the governor spring opposite to that which acts on the governor weights so that the driving and driven parts shall have such friction between them as will transmit the regular drive to the governor but will permit oscillating slip to occur in the event of rapid reversals of torque due to torsional oscillations in the rotary driving member.

2. In a fluid pressure engine, the combination of a crankshaft, a flywheel on one end of the crankshaft, a driven device including a centrifugal governor for controlling the speed of the engine freely mounted on the other end of the crankshaft, and a frictional coupling device connecting said driven device directly to the crankshaft, said driven device having such inertia and said coupling device having such frictional connection between its parts that while the latter will transmit the regular drive to the governor at all times it will permit oscillating slip to occur in the event of rapid reversals of torque due to torsional oscillations in the crankshaft.

In testimony whereof I have signed my name to this specification.

HARRY RALPH RICARDO.